United States Patent
Herledan et al.

(10) Patent No.: US 7,643,470 B2
(45) Date of Patent: Jan. 5, 2010

(54) METHOD AND AN ASSOCIATED DEVICE FOR SETTING UP A TRANSFER OF DATA BETWEEN TWO COMMUNICATIONS DEVICES

(75) Inventors: Frédéric Herledan, Meylan (FR);
Hervé Provost, Seyssinet-Pariset (FR)

(73) Assignee: France Telecom, Paris (FR)

( * ) Notice: Subject to any disclaimer, the term of this patent is extended or adjusted under 35 U.S.C. 154(b) by 665 days.

(21) Appl. No.: 10/945,837

(22) Filed: Sep. 21, 2004

(65) Prior Publication Data

US 2005/0074008 A1    Apr. 7, 2005

(30) Foreign Application Priority Data

Sep. 23, 2003    (FR)    ................................. 03 50590

(51) Int. Cl.
*H04L 12/66* (2006.01)
*G06F 15/16* (2006.01)

(52) U.S. Cl. .................. 370/352; 370/251; 370/260; 370/351; 370/355; 370/401; 709/204; 709/205

(58) Field of Classification Search ......... 370/251–401; 709/204, 205
See application file for complete search history.

(56) References Cited

U.S. PATENT DOCUMENTS

| | | | |
|---|---|---|---|
| 6,011,579 A * | 1/2000 | Newlin | 348/14.08 |
| 6,064,653 A * | 5/2000 | Farris | 370/237 |
| 6,097,793 A | 8/2000 | Jaendel | |
| 6,519,250 B1 * | 2/2003 | Fan | 370/352 |
| 6,711,160 B2 * | 3/2004 | Chan et al. | 370/354 |
| 6,747,995 B1 * | 6/2004 | Brown et al. | 370/493 |
| 6,873,854 B2 * | 3/2005 | Crockett et al. | 455/518 |
| 6,928,070 B2 * | 8/2005 | Emerson, III | 370/352 |
| 6,981,022 B2 * | 12/2005 | Boundy | 709/204 |
| 7,039,044 B1 * | 5/2006 | Whitfield et al. | 370/356 |
| 7,061,901 B1 * | 6/2006 | Shnitzer et al. | 370/352 |
| 7,283,519 B2 * | 10/2007 | Girard | 370/353 |
| 7,394,761 B2 * | 7/2008 | Foster et al. | 370/227 |
| 2003/0076819 A1 * | 4/2003 | Emerson, III | 370/352 |
| 2003/0088619 A1 * | 5/2003 | Boundy | 709/204 |

FOREIGN PATENT DOCUMENTS

| | | |
|---|---|---|
| EP | 0 878 940 A2 | 11/1998 |
| EP | 1 009 153 A | 6/2000 |

* cited by examiner

*Primary Examiner*—Ayaz R Sheikh
*Assistant Examiner*—Venkatesh Haliyur
(74) *Attorney, Agent, or Firm*—Cohen Pontani Lieberman & Pavane LLP

(57) ABSTRACT

A technique of setting up a transfer of data between two communications devices. The devices are connected to an IP network via respective subscriber lines each conveying a voice and signaling channel and a data channel. The IP address of one of the devices is sent to the other device on the voice and signaling channel using a signaling mode of that channel. The transfer of data is effected after setting up a session on the data channel.

6 Claims, 2 Drawing Sheets

METHOD AND AN ASSOCIATED DEVICE FOR SETTING UP A TRANSFER OF DATA BETWEEN TWO COMMUNICATIONS DEVICES

The present invention relates to the field of telecommunications and, in that field, to methods of setting up a transfer of data between two communications devices that are connected to each other by a telecommunications network, and to communications devices for setting up this kind of transfer. The terminal portion of the network connected to a communications device is called a subscriber line. These methods of setting up a transfer of data are operative in particular when setting up a videoconference between two computers connected to each other by a telecommunications network. In the remainder of the application, the term "network" refers interchangeably to a plurality of segments of the same network and to a set of segments of different interconnected networks forming a web that may in particular be implemented by a public switched telephone network (PSTN), or by packet mode transmission networks, of which the TCP/IP network commonly known as the Internet is one example, as opposed to switched networks. The transmission control protocol (TCP) is a level 4 (transport layer) connected mode protocol used on the Internet over the Internet Protocol (IP). There are other networks that use the IP, in particular UDP/IP networks. The UDP (user datagram protocol) is a level 4 (transport layer) non-connected mode protocol used on the Internet over the IP. Below in this application, a network using the IP is referred to as an IP network. The term "subscriber line" means a telecommunications line set up either via a fixed network or via a wireless network. In each case the subscriber line is identified by the telephone number assigned to the person or entity responsible for paying the line subscription charges.

BACKGROUND OF THE INVENTION

Prior art videoconference systems fall into two categories.

A first category comprises professional point-to-point and point-to-multipoint systems, which use a digital telephone-network such as the ISDN and conform to the H320 standard. They enable users to contact one another using their telephone subscriber numbers. They are limited by the capacity of an ISDN line, which is at most twice 64 kbit/s. It is possible to couple a plurality of ISDN lines together to increase capacity, but this leads to an increase in the cost of using the system.

A second category comprises consumer systems using the Internet and conforming to the H323 standard, for example. These systems exploit the high capacity of the offers from Internet service providers (ISP). Using asymmetric digital subscriber line (ADSL) technology, these offers provide capacities of 64 kbit/s in the uplink direction and 128 kbit/s in the downlink direction, or even 256 kbit/s and 1024 kbit/s, respectively. The methods employed by these systems provide very good picture and sound quality, but they do have drawbacks. One of the more important drawbacks is that their bit rate is not guaranteed. However, since these offers are based on a fixed charge for access to the Internet, calls cost the user nothing. Moreover, when executed by a computer, these methods require the user to have some knowledge of the underlying technicalities of computer identification on the Internet, and more generally on any IP network. Obtaining a fixed IP address that identifies a computer permanently is a costly operation for a consumer. This leads to the use of temporary IP addresses assigned to the user by the service provider. This address is not only temporary but also assigned for a period that is unknown to the user, which is reflected in unilateral withdrawal of the address at the initiative of the ISP at the end of that period. Although the user may immediately demand another IP address, and obtain it quickly, this withdrawal of the IP address without warning suddenly breaks off any videoconference that might be in progress.

Users wishing to interconnect in an IP videoconference may simplify their task by using dynamic domain name servers (DNS) which indicate the latest IP address assigned to a computer, provided that the symbolic name given to the computer is known. This method therefore enables the IP address of the computer with which the videoconference must be established to be recovered by interrogating a dynamic DNS. However, it has the following drawbacks. Firstly, the user must know the addresses of the dynamic DNSes. Secondly, each computer must declare itself to the dynamic DNS(es) so that they can identify it (them). Moreover, the user must know the symbolic name of the computer that is to be connected in a videoconference. Furthermore, the dynamic DNSes must be available for users to be able to interrogate them. Finally, this method necessitates intermediate equipment for setting up a videoconference between two computers.

OBJECTS AND SUMMARY OF THE INVENTION

An object of the invention is to alleviate the drawbacks of prior art techniques of setting up a transfer of data between first and second devices by means of a telecommunications network comprising an IP network. A particular object of the invention is to facilitate the relaunching of a session between two devices to re-establish an interrupted videoconference between those devices as a result of a change in the IP address of one of the devices.

To this end, the invention provides a method of setting up a transfer of data between a first communications device and a second communications device connected to each other by means of a telecommunications network comprising an IP network. The first device is equipped with software for sending/receiving data transmitted by the network, a first network interface connected to a subscriber line of the telecommunications network conveying a signaling channel and a second network interface connected to a subscriber line of the telecommunications network conveying a data channel. The method includes the step of the first device sending its IP address to the second device via the signaling channel using a specific signaling mode.

The invention further provides a communications device for setting up a transfer of data with another communications device. The device is equipped with data sending/receiving software, a first network interface and a second network interface. Each of the two network interfaces is connected to the same subscriber line conveying a signaling channel and a data channel separated by a filter and sent to the first network interface and to the second network interface, respectively. The device includes software for executing the step of the device sending its IP address to the other device via the signaling channel using a specific signaling mode.

Thus the use of a particular signaling mode on a signaling channel enables the first device to send its IP address to the second device. The second device can then call the first device, knowing its IP address.

Consequently, a method and a device of the invention limit user intervention in the process of recovering the IP addresses of the corresponding devices and consequently limit the problems that users may encounter in relaunching a session.

In one particular embodiment of the above device the software is further adapted to execute the following preliminary steps:

the device is connected to an IP network via its data channel and via a service provider, and the device stores a dynamic address supplied by the service provider to which it is connected, and the following step:

the device waits for a call from the other device sent on the data channel using the IP address of the device known to the other device.

After sending its IP address, the first device preferably waits for a call from the second device sent on the data channel using the IP address of the first device known to the second device. This preferred mode secures the sending and receiving of data by refusing any call other than that emanating from the second device, for example.

The invention further provides a method of setting up a transfer of data between a first communications device and a second communications device. The first device is equipped with software for sending/receiving data, a first network interface connected to a subscriber line of the telecommunications network conveying a signaling channel, and a second network interface connected to a subscriber line of the telecommunications network conveying a data channel. Each subscriber line is connected to an IP network including an IP directory in accordance with the ENUM standard that identifies a device from its telephone number. The method comprises the following steps:

the first device is connected to an IP network via the data channel and via a service provider, the first device stores a dynamic address supplied by the service provider to which it is connected and enters that address in the directory, the first device calls the second device on the signaling channel to trigger interrogation of the directory by the second device and reading by the latter of the IP address of the first device, and the first device waits from a call from the second device sent on the data channel by means of the IP address of the first device read in the directory by the second device.

In this mode, the IP address of the first device is sent indirectly to the second device by means of a signaling channel.

The invention further provides a method of setting up a transfer of data between a first communications device and a second communications device. Each of the two devices is equipped with software for sending/receiving data, a first network interface connected to a subscriber line of the telecommunications network conveying a signaling channel, and a second network interface connected to a subscriber line of the telecommunications network conveying a data channel. The method comprises the following steps:

the first device is connected to an IP network via its data channel and via a service provider, the first device stores a dynamic address supplied by the service provider to which it is connected, the first device sends its IP address to the second device via its signaling channel using a specific signaling mode and, in response to the sending of the IP address from the first device to the second device:

the second device is connected to an IP network via its data channel and via a service provider, the second device stores a dynamic address supplied by the service provider to which it is connected, the second device sends its IP address to the first device via its signaling channel using a specific signaling mode, and when prompted by its data sending/receiving software, the first device sends a call to the second device on its data channel using the IP address of the second device.

The invention further provides a method of setting up a transfer of data between a first communications device and a second communications device. Each of the two devices is equipped with software for sending/receiving data, a first network interface connected to a subscriber line of the telecommunications network conveying a signaling channel, and a second network interface connected to a subscriber line of the telecommunications network conveying a data channel. The method comprises the following steps:

each of the two devices is connected to an IP network via its data channel and via a service provider, each of the two devices stores a dynamic address supplied by the service provider to which it is connected, each of the two devices sends its IP address to the other device via its signaling channel using a specific signaling mode, and when prompted by its data sending/software, the first device sends a call to the second device on its data channel using the IP address of the latter device.

The network interfaces handle adaptation of the signals sent via the network between the device and the network. The network interfaces are modems if the subscriber line(s) of the device form(s) part of a PSTN coupled to an xDSL offer.

The invention applies equally to a fixed network with xDSL offers and to a mobile network. In particular, the general packet radio services (GPRS) standard defines a plurality of channels including a low bit rate digital voice channel that may in particular serve as a signaling channel and high bit rate channels intended for IP data transmission. Moreover, the invention may be implemented with any fixed or mobile IP data network, not only with a network coupled to xDSL offers.

Thus the subscriber line may form part of different types of network.

In the case of an analog network, the IP address is sent in DTMF mode using voice frequencies on a voice channel of the signaling channel. In particular, the IP address, consisting of a series of digits, is transmitted in dual-tone multi-frequency (DTMF) mode in the form of a sequence of dual tones resulting from the translation of each digit into two frequencies.

However, in the case of an analog network (PSTN) having a number and name offering function, IP addresses may be sent using an analog signaling mode for number and name offering.

In the case of a digital network (ISDN), IP addresses are sent using a D channel signaling mode. In particular, the IP address, consisting of a series of digits, is sent in the Q.931 signaling mode, instead of the calling user's installation number.

The method of the invention may be used for different types of data exchange. The uses of the invention include videoconferences and file transfer between two devices in accordance with the file transfer protocol (FTP), for example.

In a manner complementary to sending IP addresses, the method may additionally send an indication of the remote service that is to be activated. To this end, it may use a mechanism similar to that used by standard IP ports, whereby the first device sends a code in addition to its IP address. For example, the use of a code 21 signifies that the device wishes to perform an FTP file transfer.

The subscriber line may be common to both network interfaces or different for each of the two network interfaces. When the subscriber line is common to both network interfaces, the signaling channel and the data channel are conveyed by the same subscriber line, are separated by a filter, and are sent towards the first network interface and the second network interface, respectively. If there is a different subscriber line for each of the two network interfaces, the signaling channel is conveyed on the subscriber line connected to the first network interface and the data channel is conveyed on the subscriber line connected to the second network interface.

Any implementation of a method of the invention may either be started automatically when the device on which the method is executed is started up or it may be initiated by external action. The external action may consist in the activation of a user interface of the device. Furthermore, the sending of its IP address by the first device may either follow on automatically from storing its IP address or be initiated by external action. This action may be dialing the subscriber number of the second device on a telephone connected to the first device and to the subscriber line of the first device, the first device detecting the number dialed.

A communications device of the invention is typically a personal computer. It may nevertheless take other forms, such as a personal digital assistant (PDA) or any other device that incorporates the means necessary for executing a method according to the invention.

BRIEF DESCRIPTION OF THE DRAWINGS

Other features and advantages of the invention become apparent in the light of the following description, which is given with reference to the appended drawings, which show non-limiting examples of the invention.

MORE DETAILED DESCRIPTION

Figure 1:
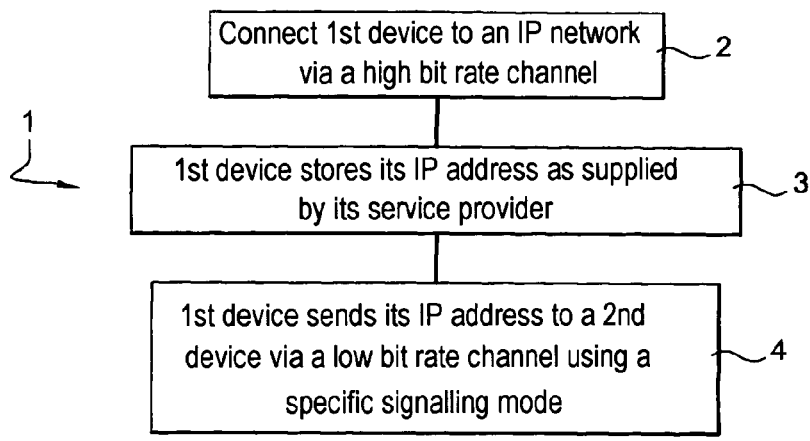
FIG. 1 is a flowchart of one implementation of a method of the invention.

FIG. 1 is a flowchart of one implementation of a method of the invention. This implementation of the method is used to set up a videoconference between first and second devices via an IP network, which in this example is the Internet. The first device is equipped with videoconference software, a low bit rate modem and a high bit rate modem. Each of the two modems is connected to the same subscriber line, which conveys a low bit rate channel and a high bit rate channel separated by a filter and sent respectively to the low bit rate modem and to the high bit rate modem.

The method 1 comprises the steps described below.

In a first step, the first device is connected (2) to the Internet via a service provider on its high bit rate channel.

In a second step, the first device stores (3) a dynamic IP address assigned by the service provider to which it is connected.

In a third step, the first device sends (4) its IP address to the second device via the signaling channel and using a specific signaling mode. The first device may send the code 1720 with its IP address to tell the second device that it wishes to set up a videoconference.

Figure 2:
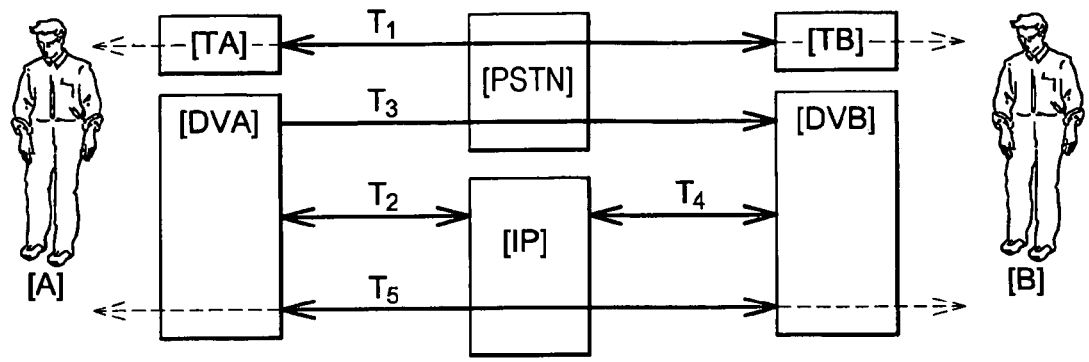
FIG. 2 is a diagram of a first implementation of a method of the invention for establishing a transfer of data to establish a videoconference.

FIG. 2 is a diagram of a first implementation of a method of the invention for establishing a transfer of data to establish a videoconference.

In this implementation of the method two users A and B set up a telephone call and, while conversing, decide to continue by way of a videoconference.

Each user A, B has a computer DVA, DVB and a telephone TA, TB. For each of the users A and B, the telephone TA or TB, is connected to a public switched telephone network PSTN by an xDSL subscriber line. The computer DVA or DVB, is connected to an IP network, which is the Internet in this example, by means of the same subscriber line as the corresponding telephone terminal TA or TB, and via a service provider ISP_A or ISP_B. The subscriber line of each of the users A and B conveys a low bit rate channel called the voice and signaling channel and a high bit rate channel called the data channel.

In a first time period T1, user A uses the telephone handset TA to call the other party B on the low bit rate channel of that party's subscriber line. User A dials the telephone number of party B on his telephone handset TA. After party B has picked up the handset, user A and party B converse.

In a second time period T2, the users A and B decide to continue by way of a videoconference. User A clicks on a button for activating the videoconference software installed on computer DVA. This connects the computer DVA to the Internet via the high bit rate channel of User A's subscriber line and via User A's service provider ISP_A. The service provider ISP_A assigns a dynamic IP address to the computer DVA. The computer DVA stores this IP address.

In a third time period T3, the computer DVA sends its IP address to the computer of user B. The computer DVA sends this address via the low bit rate (voice) channel of user A's subscriber line using DTMF voice frequencies. Thus the IPv4 address, which comprises four sets of three digits, is sent in the form of a sequence of twelve dual tones.

From the point of view of user B, the computer DVB may receive the IP address of user A in another signaling mode, in particular a signaling mode that is related to the type of network including user B's subscriber line. For example, if user B's subscriber line is part of a digital network, then the IP address may be received in a D channel signaling mode.

In a fourth time period T4, user B's computer DVB is connected to the Internet via the high bit rate channel of the corresponding subscriber line. This connection follows reception of user A's IP address on the low bit rate channel and is effected via user B's service provider ISP_B. The service provider ISP_B assigns a dynamic IP address to the computer DVB. The computer DVB stores this IP address.

In a fifth time period T5, the computer DVB sends a call for a videoconference to the computer DVA on the high bit rate channel of user B's subscriber line using the IP address of the computer DVA.

Once the videoconference has been set up, the users A and B may communicate on the high bit rate channel and can terminate their telephone conversation. However, if both users wish to optimize the real bit rate available on the IP link, they may continue the telephone call and not activate the audio coders/decoders controlled by the videoconference software. A configuration of this kind provides the maximum quality and fluidity for the available bit rate.

If the videoconference session is suddenly broken off following a change of IP address or a unilateral disconnection by one of the service providers ISP_A or ISP_B, it may be relaunched automatically or manually. Automatic or manual relaunching restarts the session from the second stage. However, in the case of a manual relaunch by one of the users, or by both users independently of each other, the user(s) may choose to phone first. Relaunching may be automatic because the disconnected device is able to diagnose the cause of the break in a manner that is known in the art.

Unilateral disconnection by the service provider is referred to as a drop. For example, there are ADSL offers for which a drop occurs every 24 hours or once a week. Subscribing to a fixed IP address service does not avoid the drop. However, the IP address supplied by the service provider is always the same on each connection, for example after a drop.

Figure 3:
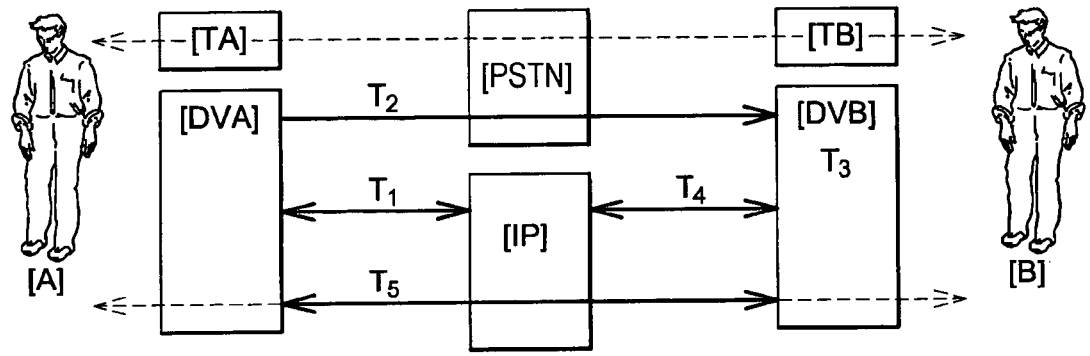
FIG. 3 is a diagram of a second implementation of a method of the invention for establishing a transfer of data to establish a videoconference.

FIG. 3 is a diagram of a second implementation of a method of the invention for establishing a transfer of data to establish a videoconference.

Each user A, B has a computer DVA, DVB and a telephone TA, TB. For each of the users A and B, the telephone TA or TB is connected to a public switched telephone network PSTN by an xDSL subscriber line. The computers DVA and DVB are connected to the Internet via the same subscriber lines as the corresponding telephone terminals TA and TB, and via respective service providers ISP_A and ISP_B. The subscriber line conveys a low bit rate channel called the voice and signaling channel and a high bit rate channel called the data channel.

In a first time period T1, while it is started up, user A's computer DVA is connected to the Internet via the high bit rate channel of the subscriber line and via the service provider ISP_A. The service provider ISP_A assigns a dynamic IP address to the computer DVA. The computer DVA stores this IP address.

In a second time period T2, the computer DVA sends its IP address to user B's computer DVB. The computer DVA sends this address via the low bit rate channel of user A's subscriber line. The computer DVA may prompt user A to enter user B's telephone number. This number may be a default value stored by the computer DVA. Alternatively, user B's telephone number may be entered via user A's telephone TA. This presupposes that the computer DVA has means for detecting the off-hook condition and reading the number that is entered. In this case, the computer DVA starts sending its IP address using the number it has read. The IP address is sent using a signaling mode. As described with reference to FIG. 2, it may be sent using DTMF voice frequencies on the speech channel in the case of an analog PSTN. The signaling mode used in the case of an analog PSTN may be an analog signaling mode for number and name offering. Accordingly, by adapting the call processing effected within the network, the computer DVA calls the telephone number of the computer DVB and at the same time transmits its own dynamic IP address, for example by dialing over an established connection. In the case of an ISDN, the IP address may be sent by means of a D channel signaling mode. Thus the IP address may be sent in the signaling instead of the subscriber installation number or supplementary designation number (SDN).

In a third time period T3, the computer DVB receives the telephone call from the computer DVA via the low bit rate channel of user B's subscriber line, the calling telephone number and the dynamic ID address of the computer DVA being indicated in the signaling. The computer DVB may instigate an alert to advise user B of a videoconference call request. User B may choose between:
 responding vocally by picking up the telephone TB, in which case communication is by voice only, or
 responding to the videoconference request, in which case the videoconference is accepted by clicking on a button for activating the videoconference software installed on the computer DVB, for example. In this case, the computer DVB does not respond to the call on the low bit rate channel. Alternatively, the videoconference software installed on the computer DVB may be equipped with a button that limits the videoconference to the exchange of speech, which is the equivalent of Telephone over IP (ToIP). This may be combined with another button for setting up the exchange of pictures and selecting a videoconference configuration with exchange of pictures and audio data.

In a fourth time period T4, user B's computer DVB is connected to the Internet via the high bit rate channel of the subscriber line. This connection is made on acceptance of the videoconference request after the IP address of computer DVA is received on the low bit rate channel. The connection is made via user B's service provider ISP_B. The service provider ISP_B assigns a dynamic IP address to the computer DVB. The computer DVB stores this IP address.

In a fifth time period T5, the computer DVB sends a call for a videoconference to the computer DVA on the high bit rate channel of user B's subscriber line and using the IP address of the computer DVA. Once the videoconference has been set up between the computers, user A may hang up on telephone TA, if it is off-hook, in order to clear down the telephone call. Alternatively, this may be done automatically by the computer DVA.

Once the videoconference has been set up, users A and B may communicate over their high bit rate channel.

If the videoconference session is broken off suddenly as the result of a change of IP address or unilateral disconnection by one of the service providers ISP-A or ISP-B, the session may be relaunched automatically or manually. Automatic or manual relaunching restarts the session from the first stage. The relaunch may be automatic because the disconnected device is able to diagnose the cause of the break in a manner that is known in the art.

Figure 4:
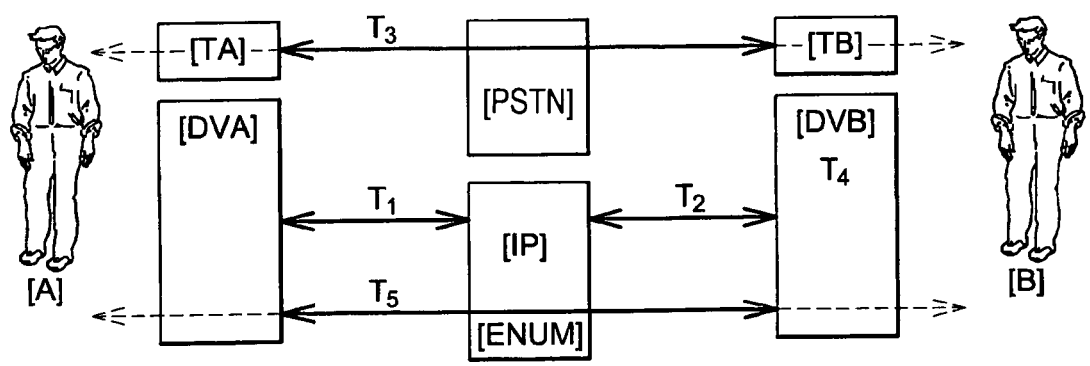
FIG. 4 is a diagram of a third implementation of a method of the invention for establishing a transfer of data to establish a videoconference.

FIG. 4 is a diagram of a third implementation of a method of the invention for establishing a transfer of data to establish a videoconference.

Each user A, B has a computer DVA, DVB and a telephone TA, TB. For each of the users A and B, the telephone TA or TB is connected to a public switched telephone network PSTN via an xDSL subscriber line. The computers DVA and DVB are connected to the Internet via the same subscriber lines as the corresponding telephone terminals TA and TB, and via respective service providers ISP_A and ISP_B. The Internet provides an IP directory conforming to the ENUM standard which identifies a device from its telephone number. Each subscriber line conveys a low bit rate channel called the voice and signaling channel and a high bit rate channel called the data channel.

In a first time period T1, when it is started up, user A's computer DVA is connected to the Internet via the high bit rate channel of the subscriber line. This connection is effected via user A's service provider ISP_A. The service provider ISP_A assigns a dynamic IP address to the computer DVA. The computer DVA stores this IP address and enters it in the ENUM directory.

In a second time period T2, when it is started up, user B's computer DVB is connected to the Internet via the high bit rate channel of the subscriber line and via the service provider ISP_B. The service provider ISP_B assigns a dynamic IP address to the computer DVB. The computer DVB stores this IP address and enters it in the ENUM directory.

In a third time period T3, the computer DVA prompts the computer DVB to read its IP address in the ENUM directory by means of a call sent on the low bit rate channel of user A's subscriber line. This call is the direct result of user A picking up telephone TA handset and entering user B's telephone number, or of the equivalent action performed by the computer DVA. In which case, in order to contact the other party, the computer DVA may prompt user A to enter user B's telephone number, which may be a default value stored by the computer DVA.

The computer DVB receives the telephone call from the computer DVA via the low bit rate channel of user A's subscriber line. The reception of this call triggers interrogation of the ENUM directory by the computer DVB, using the telephone number obtained from the incoming call, to recover the IP address of the computer DVA.

In a fourth time period T4, the computer DVB may trigger an alert to advise user B of a call request. The user B may choose between:
  responding vocally by picking up the telephone TB, in which case communication is by voice only, or
  responding to the videoconference request; the videoconference request is accepted by clicking on a button for activating the videoconference software installed on the computer DVB, for example. In this case, the computer DVB does not respond to the call on the low bit rate channel. Alternatively, the videoconference software installed on the computer DVB may have a button that limits the videoconference to the exchange of speech, which is the equivalent of Telephone over IP (ToIP). This may be combined with another button for setting up the exchange of pictures and selecting a videoconference configuration with exchange of pictures and audio data.

In a fifth time period T5, the computer DVB sends a call for a videoconference to the computer DVA on the high bit rate channel of its subscriber line and using the IP address of the computer DVA. Once the videoconference has been set up between the computers, user A may hang up on telephone TA, if it is off-hook, in order to clear down the telephone call. Alternatively, this may be done automatically by the computer DVA. Once the videoconference has been set up, users A and B can communicate over their high bit rate channel.

If the videoconference session is broken off suddenly as the result of a change of IP address or of a unilateral disconnection by one of the service providers ISP-A or ISP-B, the session may be relaunched automatically or manually. Automatic or manual relaunching restarts the session from the first stage. The relaunch may be automatic because the disconnected device is able to diagnose the cause of the break in a manner that is known in the art.

The implementations described above may be combined to yield further embodiments.

Figure 5:
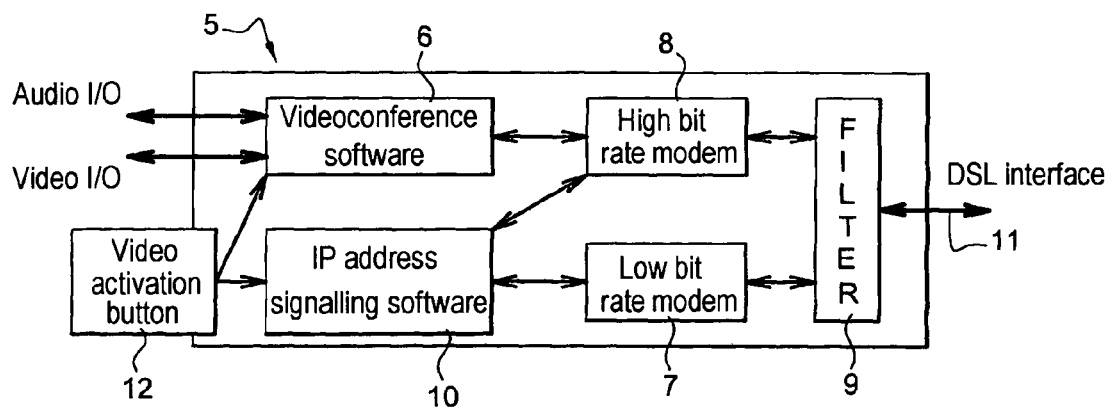
FIG. 5 is a diagram of one embodiment of a communications device of the invention.

FIG. 5 is a diagram of one particular embodiment of a communications device of the invention.

The communications device 5 comprises software 6 for sending/receiving data, a low bit rate modem 7, a high bit rate modem 8, a filter 9, and software 10 for executing the method of the invention. Each of the two modems is connected to the same subscriber line 11, which conveys a low bit rate signaling channel and a high bit rate data channel separated by the filter and sent respectively to the low bit rate modem and to the high bit rate modem.

The device 5 typically comprises a standard multimedia microcomputer to which the following are added:
  a low bit rate PSTN modem,
  a high bit rate ADSL modem,
  an ADSL filter external to the microcomputer,
  videoconference software such as E-CONF from France Telecom, and
  software adapted to execute the method of the invention, which may be written in C using a program library such as Microsoft TAPI.

The device may be completed with an analog or digital telephone interface and a button 12 for activating the videoconference software.

The chaining of the steps of the method of the invention may differ from that described with reference to FIGS. 2 to 4. In particular, the connection to an IP network may be set up independently of setting up a data transfer between first and second communications devices. In this case, the device does not reconnect to the IP network and the method recovers the IP address already assigned to the device.

A method of the invention may be implemented with more than two devices, depending on the capabilities of the software for sending/receiving data, for example. In particular, a videoconference may be set up with three devices, in which case a first device sets up a data transfer with a second device and with a third device. The data transfer between the first device and each of the other devices is set up using a method of the invention.

What is claimed is:

1. A method of setting up a data transfer between a first communications device and a second communications device connected to each other via a telecommunications network comprising an IP network and an analog network by re-launching an interrupted communication session between the first and second communications devices to re-establish between the first and second communications devices the communication session that was interrupted due to a change of an IP address of one of the first and second communications devices, each of the first and second communications devices being equipped with software for sending/receiving the data, a first analog network interface connected to a subscriber line of the telecommunications network conveying a voice and signaling channel, and a second network interface connected to the subscriber line of the telecommunications network conveying a data channel, the method comprising the steps of:
  connecting the first communications device to the IP network via a data channel of the first communications device and via a service provider;
  storing in the first communications device a first dynamic address assigned by the service provider to which the first communications device is connected;
  sending from the first communications device to the second communications device the IP address of the first communications device via the voice and signaling channel using a specific signaling mode;
  connecting the second communications device to the IP network via a data channel of the second communications device and via the service provider in response to receiving the IP address sent from the first communications device;
  storing at the second communications device a second dynamic address supplied by the service provider to which the second communications device is connected;
  sending from the second communications device to the first communications device the IP address of the second communications device via the voice and signaling channel using the specific signaling mode;
  waiting at the second communications device for a call from the first communications device to be sent on the data channel using the IP address of the second communications device sent to the first communications device from the second communications device; and sending a call from the first communications device to the second communications device on the data channel when prompted by the data sending/receiving software of the first communications device using the IP address of the second communications device to re-launch the interrupted communication session between the first and second communications devices to re-establish between the first and second communications devices the communication session that was interrupted due to the change of the IP address of one of the first and second communications devices.

2. The method according to claim 1, wherein when the subscriber line of the telecommunications network is connected to the first analog network interface which forms part of the analog network, the IP address is sent in DTMF mode using voice frequencies on the voice and signaling channel.

3. The method according to claim 2, wherein the IP address consists of a series of digits and is sent in DTMF mode as a sequence of dual tones resulting from a translation of each digit into dual frequencies.

4. The method according to claim 1, wherein when the subscriber line of the telecommunications network is connected to the first analog network interface which forms part of the analog network having a number and name offering function, the IP address is sent using an analog number and name offering signaling mode.

5. A method of setting up a data transfer between a first communications device and a second communications device connected to each other via a telecommunications network comprising an IP network and an analog network by re-launching an interrupted communication session between the first and second communications devices to re-establish between the first and second communications devices the communication session that was interrupted due to a change of an IP address of one of the first and second communications devices, each of the first and second communications devices being equipped with software for sending/receiving the data, a first analog network interface connected to a subscriber line of the telecommunications network conveying a voice and signaling channel, and a second network interface connected to the subscriber line of the telecommunications network conveying a data channel, the method comprising the steps of:

connecting each of the first and second communications devices to the IP network via the data channel and via a service provider;

storing at each of the first and second communication devices a dynamic address supplied by the service provider to which each of the first and second communications devices is connected;

sending from each of the first and second communications devices the IP address of each of the first and second communications device to the other device via the voice and signaling channel using a specific signaling mode;

waiting at the second communications device for a call from the first communications device to be sent on the data channel using the IP address of the second communications device sent to the first communications device from the second communications device; and sending a call from the first communications device to the second communications device on the data channel when prompted by the data sending/software of the first communications device using the IP address of the second communications device to re-launch the interrupted communication session between the first and second communications devices to re-establish between the first and second communications devices the communication session that was interrupted due to the change of the IP address of one of the first and second communications devices.

6. The method according to claim 1, wherein the data transfer is set up between the first and second communications devices, the method further comprising the step of:

detecting by the data sending/receiving software a break in the data transfer which is triggered by an occurrence of a re-launch of any previous step of the method.

* * * * *